Feb. 3, 1931. J. REGENSTREIF 1,791,427
BULB FEEDER FOR SEALING-IN MACHINES
Filed Aug. 5, 1927

Inventor:
Jacob Regenstreif,
by
His Attorney.

Patented Feb. 3, 1931

1,791,427

UNITED STATES PATENT OFFICE

JACOB REGENSTREIF, OF BERLIN, GERMANY, ASSIGNOR TO GENERAL ELECTRIC COMPANY, A CORPORATION OF NEW YORK

BULB FEEDER FOR SEALING-IN MACHINES

Application filed August 5, 1927, Serial No. 210,973, and in Germany September 28, 1926.

In machines for sealing stems into the bulbs of electric incandescent lamps and similar closed glass vessels the loading of the bulbs into the machine is done by hand, as the suggestions hitherto made for automatic feeding of the bulbs did not offer a simple and safe way of transmitting a sufficient number of fragile bulbs.

The primary object of this invention is the production of a simply constructed bulb feeding device which will reliably and safely transmit the bulbs to and load them into the sealing in machine. In accordance with the invention, a movable bulb carrier, such as a conveyor belt, is arranged to hold bulbs suspended in rows which are transverse to its direction of movement, and from it, by a transfer device, the bulbs in a transverse row are pushed out of the first conveyor onto a second conveyor belt which moves across the first conveyor parallel to the rows of bulbs and therefore transverse to the direction of travel of the first conveyor. The bulbs pushed out of the first conveyor now lie crosswise and side by side on the second conveyor and are delivered one after the other, by a chute into the bulb holder forks of the sealing in machine set up close to the second conveyor. As the first conveyor carries a large number of bulbs, in consequence of the bulbs being suspended in rows transverse to the belt, and thus represents a sort of bulb storage device, the bulb feeding device need be provided with new bulbs only at long intervals, by depositing from time to time a large number of bulbs on the first conveyor belt, whereupon for a long time the sealing in machine is automatically and continuously supplied with bulbs.

The first conveyor belt is advantageously arranged so that the bulbs may be suspended on it in a number of parallel rows across the belt, as by a series of holes in the belt, or preferably by providing the belt with catches or holders for holding on the belt one or more bulb trays, such as are commonly used in the incandescent lamp industry, so that hand transfer of the bulbs from the trays is avoided, and the bulbs are directly fed from the trays to the sealing in machine.

Figure 1:
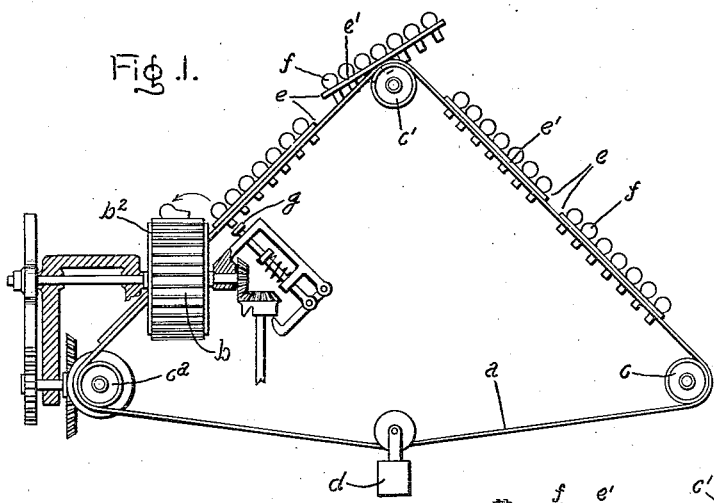
Figure 2:
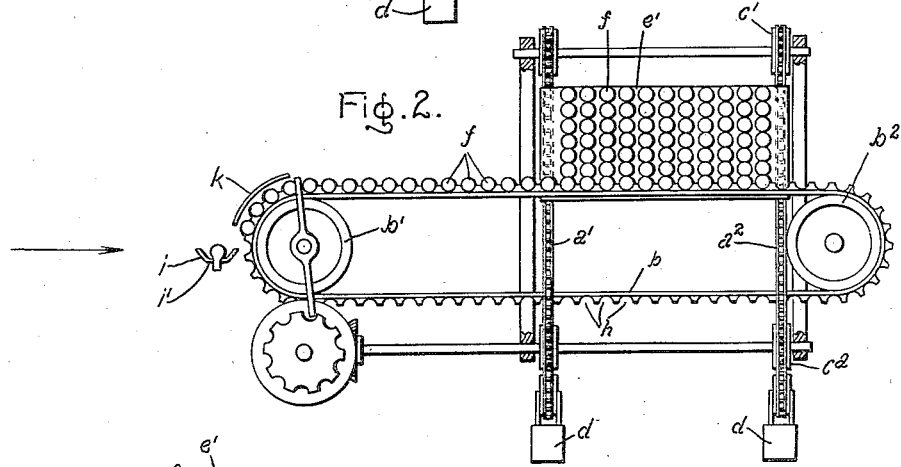
Figure 4:
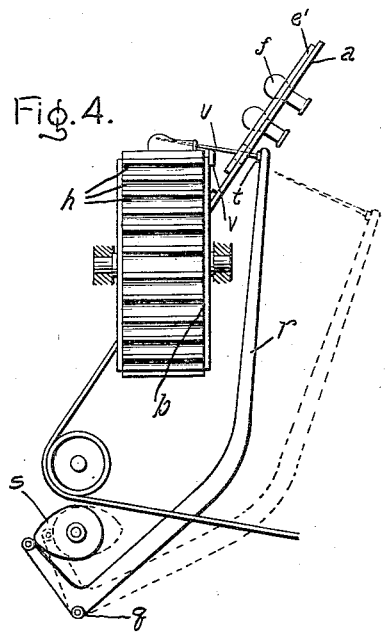
Figure 3:
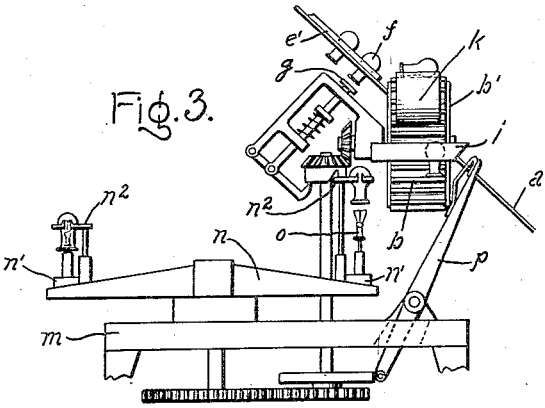

An example of one form in which the bulb feeding device may be constructed is diagrammatically shown in the drawing, in which Fig. 1 is an end view,
Fig. 2 is a side view of the mechanism of Fig. 1,
Fig. 3 is a side view looking in the direction of the large arrow A in Fig. 2,
Fig. 4 is an end view of a somewhat modified form of a portion of the device.

The arrangement shown in Figs. 1 to 3 consists essentially of two bulb carriers, such as two endless conveyor belts, which travel in two planes perpendicular to each other. The first conveyor belt $a$ may be conveniently made of two sprocket chains $a'$, $a^2$ suitably tensioned and carried over three sprockets $c$, $c'$, $c^2$, positioned to give the conveyor belt the approximate shape of a triangle. The entire conveyor belt $a$ may be tensioned, as by weights $d$ carried by pulleys which ride on the sprocket chains so that the portion or run of the conveyor belt from $c$ to sprocket $c'$, and thence to sprocket $c^2$ are inclined planes. The bulbs are suspended on the conveyor belt $a$ preferably in rows transverse to the direction of travel of the belt, and a convenient way to suspend the bulbs on the belt is to provide the belt with holders or catches for holding at even intervals the bulb trays or frames $e'$ of tin or woven wire such as are generally used in the lamp industry for transporting bulbs. These trays have longitudinal and also transverse rows of holes for receiving the bulbs $f$. In the example shown, each tray or metal plate $e'$ has seven parallel rows of holes, each row consisting of eleven holes, the eleven holes of each of the seven rows being arranged to form a row extending longitudinally of the tray. The operator can conveniently transport 77 lamps at a time from the bulb washing place or from the stock of bulbs to the conveyor belt $a$, and suspend them on the belt by carrying a full tray of bulbs to the machine and placing the full tray on the conveyor $a$.

The second conveyor $b$ is preferably a belt which runs over two pulleys $b'$, $b^2$ in the direction of the rows of bulbs arranged transversely on the first conveyor belt. In order that the transfer of the bulbs $f$ from the conveyor $a$ to the horizontal conveyor belt $b$ may take place as safely and as conveniently as possible, the conveyor belt $b$ is arranged at such a height, that the inclined downward run of the conveyor $a$ passes close to the edge of the upper sides of the conveyor belt $b$ and between the upper and lower sides of belt. For the transfer of the bulbs $f$ a transfer device, such as a pusher $g$ mechanically controlled and arranged close to the conveyor belt $b$ may be used. This pusher is wide enough to lift simultaneously during its forward movement all the bulbs in the then lowest transverse row on the conveyor belt $a$, and push them from the tray $e'$, or the conveyor belt $a$ onto the conveyor belt $b$, and thereby place them side by side on the belt $b$.

Both conveyors $a$ and $b$ are moved forward intermittently, but in such time relation that the conveyor belt $a$ moves forward only when the belt $b$ has by a number of forward steps corresponding to the number of bulbs in a row conveyed out of the range of the conveyor $a$, all the bulbs which it received simultaneously from a transverse row of the conveyor belt $a$. In the present example the forward movement of belt $a$ occurs after eleven forward steps of belt $b$. The transfer of bulbs from belt $a$ to belt $b$ by the transfer device or pusher $g$ is effected while both belts are stationary and shortly after the forward movement of belt $a$. The belt $b$ is always moved forward a distance equal to the distance between the centers of the bulbs delivered to it, as determined by the spacing of the bulbs in the transverse rows on the conveyor $a$, but the conveyor $a$ is moved forward a distance corresponding to the distance between the rows of bulbs suspended on it. As the distance $e$ between two trays $e'$ is usually greater than the distance between the parallel rows of bulbs in each tray, the conveyor $a$ must, when all the bulbs on a tray have been transferred to the belt $b$, move forward a corresponding distance, greater than that between the rows of bulbs, so as to bring the first row of bulbs on the next tray within reach of the pusher $g$. In the present example the conveyor $a$ is thus given six small forward movements corresponding to the spacing between the rows of bulbs in the tray followed by a larger forward movement corresponding to the distance $e$ between adjacent trays.

The bulbs pushed from the conveyor $a$ by the action of the pusher $g$ lie side by side on the conveyor belt $b$. In order that they may be equally spaced on the belt $b$, and may not be damaged by being pushed onto the belt, the conveyor belt $b$ may be provided on its upper side with semicylindrical cups $h$ lined with a soft material, such as asbestos, felt, or pasteboard, the spacing between these cups corresponding to the spacing between the bulbs in the transverse rows of bulbs in the trays or on the conveyor $a$.

The bulbs $f$ conveyed in the cups $h$ drop during their passage over the driving pulley $b'$ of the conveyor belt $b$ into a trough-like chute $i$, which has in the bottom a longitudinal slot $i'$, of a size to receive the necks of the bulbs. The bulbs dropping into the chute place themselves with their spherical upper part between the converging side walls of the chute $i$, whilst their necks by the action of gravity pass through the slot $i'$ and hang down as shown in Figure 3. In order that no bulb can slide prematurely from the conveyor belt $b$, the part of the driving pulley $b'$ turned toward the chute $i$ is covered by a concentric guide sheet $k$ of metal.

The outlet of the troughlike chute $i$ is located over the loading point of a rotary sealing in machine, which, as usual, has an intermittently rotating spider $n$ on a table $m$ and a number of heads $n'$ arranged in a circle for holding the stems $o$ each head having a bulb fork $n^2$ for holding a bulb $f$. If the troughlike chute is sufficiently inclined, the transfer of the bulbs from the chute $i$ is effected simply by gravity as the bulbs drop into the chute, slide down to the outlet end and drop out of the chute into the head $n'$. It is, however, advantageous to arrange beneath the chute $i$ a bulb discharge device such as a swinging lever $p$, or a horizontally movable slide, which after each forward movement of the belt $b$ is moved forward mechanically and thus by pushing on the depending neck of the bulb pushes the bulb along the chute, which in this case is advantageously placed horizontal until the bulb slides off the outlet end of the chute and drops directly into that holder fork $n^2$ of the sealing in machine which has come into position below the outlet end of the chute. In order that the stem $o$ in the head $n'$ of the sealing in machine may not be damaged when the bulb $f$ drops into the ring-shaped holder fork $n^2$, the latter may advantageously be held quite high in the bulb inserting position. In the next working position of the rotatable sealing in machine the holder fork is pulled down and the bulb thus placed over the stem $o$, whereupon the usual sealing in of the stem into the bulb is effected by the use of gas burners.

Instead of pulling down the holder forks $n^2$ after they pass the loading position; that is, the position in registry with the chute $i$, the stem $o$ may be lifted up into the suspended bulb $f$. The bulbs may also be placed in the holder forks by being pushed in from the side, but in the latter case the ring-shaped bulb holder forks must be arranged so that they will open up and will be open when coming into the loading position for the reception of the bulb to be pushed in from the side.

The conveyor belt $a$ can also be arranged to do away with the placing of the trays $e'$ on the belt, and to suspend the bulbs directly on the belt as; for example, by making the conveyor belt a wire net or a perforated metal band. The delivery of the bulb $f$ to the belt $a$ can also be done automatically, instead of by hand, for example by using a conveyor belt or an inclined plane, which connects the conveyor belt $a$ with the bulb storeroom of the bulb washing place. The belt $a$ can also have other forms and be arranged differently with relation to the belt $b$. The number of trays conveyed simultaneously by the belt $a$ and also the number of openings in the trays for the bulbs is arbitrary. The transfer of the bulbs from belt $a$ to belt $b$ can also be effected by a bulb gripper for engaging the spherical part of the bulb instead of by a pusher. In place of a pusher or a bulb gripper which acts simultaneously on all the bulbs lying in a transverse row on the belt, there may be employed a number of pusher or bulb grippers arranged side by side and actuated one after the other, and thereby transfer the bulbs suspended on the belt $a$ in rows to the belt $b$.

The transfer of the bulbs from the first conveyor belt $a$ to the second conveyor belt $b$ can be done with greater safety, especially with bulbs with a larger spherical part, as shown in Figure 4, by means of a lever $r$ supported on a shaft $q$, which by the action of a rotating cam $s$ is swung out during stop of the conveyor belt $a$. The lever $r$ may have a head, made like that of a rake, by fixing to a transverse strip $t$ attached to the lever a number of parallel rods or teeth $u$ side by side. The teeth $u$ extend in the direction of the axis of the transversely suspended bulbs of the conveyor belt $a$ and also correspond in number to the number of bulbs in each transverse row on the conveyor belt $a$. Ordinarily the rake headed oscillating lever $r$ occupies the position indicated in dotted lines. As soon, however, as a forward movement of the conveyor belt $a$ has taken place, the oscillating lever $r$ is moved into the full line position, whereby the teeth $u$ enter the bulbs of the lowest row on the conveyor belt $a$ which have come into position and push them onto the conveyor belt $b$ over a downwardly somewhat springy strip $v$ arranged parallel to the edge of the conveyor belt $b$. Upon the return of the oscillating lever $r$ to the position shown in dotted lines the bulb rims lie against the strip $v$, so that the entire row of bulbs is left safely placed on the conveyor belt $b$.

What I claim as new and desire to secure by Letters Patent of the United States, is:

1. An automatic bulb feeder for sealing-in machines comprising a conveyor for holding bulbs transverse to the surface of the conveyor, a second conveyor mounted to move transversely of and adjacent to the surface of the first conveyor in position to receive a bulb from the first conveyor, a transfer device to push said bulb out of said first conveyor and cause it to lie on and crosswise of said second conveyor, a delivery chute at the discharge end of said second conveyor to deliver a bulb neck downwards to the said sealing-in machine, and actuating means for driving said conveyors and said transfer mechanism of said bulb feeder in synchronism with the sealing-in machine.

2. An automatic bulb feeder comprising a conveyor for holding bulbs transverse to the surface of the conveyor, a second conveyor mounted to move transversely of and adjacent to the surface of the first conveyor in position to receive bulbs from the first conveyor, a transfer device for transferring bulbs in succession from the first conveyor to the second, a delivery chute at the discharge end of the second conveyor, in the form of a trough having in the bottom a longitudinal slot of a width intermediate the diameter of the spherical part of the bulbs and that of the neck and mounted to deliver the bulbs neck down to the heads of the sealing-in machine.

3. An automatic bulb feeder for sealing-in machines comprising a conveyor for holding bulbs transverse to the surface of the conveyor, a second conveyor mounted to move transversely of and adjacent to the surface of the first conveyor in position to receive bulbs from the first conveyor, a transfer device for transferring bulbs in succession from the first conveyor to the second, a delivery chute at the discharge end of the second conveyor in the form of a trough having in the bottom a longitudinal slot of a width intermediate the diameter of the spherical part of the bulbs and that of the neck and mounted to deliver the bulbs neck down to the heads of the sealing-in machine, and a bulb discharge device comprising a member mounted to move along said chute towards its discharge end in position to engage the neck of a bulb in said chute and thereby push said bulb out of the chute.

4. An automatic bulb feeder for sealing-in machines comprising a conveyor constructed to receive a flat bulb tray having parallel rows of holes for bulbs and to hold said tray flat with the rows of holes transverse to the direction of travel of the conveyor, a second conveyor mounted in position to receive bulbs from the first conveyor and to move transversely of and adjacent to the surface of the first conveyor in the direction of the rows of holes in said tray, a transfer device for pushing the bulbs in each row of holes in the tray out of the tray on the first conveyor to cause said bulbs to lie on and crosswise of the second conveyor, means for driving said conveyors and said transfer device in synchronism, and a delivery chute at the discharge end of the second conveyor to receive the bulbs from said second conveyor and deliver them neck downwards.

5. An automatic bulb feeder comprising two conveyor belts mounted to travel in planes perpendicular to each other, one of said belts being mounted to travel horizontally and the other at an angle to cause a portion thereof to be inclined and to pass close to the edge of the upper side of the horizontal belt, said portion being constructed to hold bulbs suspended in horizontal rows, transfer means for automatically transferring bulbs from said inclined portion of one conveyor to the horizontal upper side of the other conveyor, a bulb delivery chute at the discharge end of the second conveyor to deliver bulbs neck downward to the sealing-in machine, and means for actuating said conveyor belts and said transfer mechanism in synchronism.

6. An automatic bulb feeder comprising a conveyor for holding bulbs in rows transverse to the direction of travel of the conveyor, a second conveyor mounted in position to receive bulbs from the first conveyor and to move transversely of the first conveyor in the direction of and adjacent to the row of bulbs thereon, a head having teeth corresponding to the bulbs in said row and mounted to oscillate transversely of said first conveyor to cause said teeth to enter the bulbs in said row and transfer them from the first conveyor to the second, driving means for actuating said sealing-in machine and said conveyors and for oscillating said head in synchronism, and a delivery chute at the discharge end of the second conveyor to deliver bulbs from said second conveyor to the sealing-in machine.

In witness whereof, I have hereunto set my hand this 23d day of July, 1927.

JACOB REGENSTREIF.